United States Patent
Pizzeta

(10) Patent No.: US 8,540,263 B2
(45) Date of Patent: Sep. 24, 2013

(54) REAR BOGIE-TYPE SUSPENSION

(75) Inventor: Remi Pizzeta, Caxias do Sul (BR)

(73) Assignee: Suspensys Sistemas Automotivos Ltda. (BR)

( * ) Notice: Subject to any disclaimer, the term of this patent is extended or adjusted under 35 U.S.C. 154(b) by 67 days.

(21) Appl. No.: 13/238,966

(22) Filed: Sep. 21, 2011

(65) Prior Publication Data

US 2013/0069333 A1    Mar. 21, 2013

(51) Int. Cl.
  *B60G 5/03*      (2006.01)
  *B60G 5/047*    (2006.01)
  *B60G 11/02*    (2006.01)

(52) U.S. Cl.
  USPC .............. 280/124.175; 280/680; 280/686

(58) Field of Classification Search
  CPC .............. B60G 5/01; B60G 5/03; B60G 5/04; B60G 5/047; B60G 5/053; B60G 9/02; B60G 11/12; B60G 11/113; F16C 23/02; F16C 23/046; F16C 35/02
  USPC ............. 280/124.11, 124.116, 124.175, 676, 280/680, 682, 686; 384/432, 434; 267/262, 267/269
  See application file for complete search history.

(56) References Cited

U.S. PATENT DOCUMENTS

| | | | | |
|---|---|---|---|---|
| 394,407 A * | 12/1888 | Sibley et al. | ..... | 474/98 |
| 2,585,489 A * | 2/1952 | Myers | ..... | 267/269 |
| 3,117,772 A * | 1/1964 | Brown | ..... | 267/269 |
| 3,367,677 A * | 2/1968 | Preddy, Jr | ..... | 280/680 |
| 3,434,734 A * | 3/1969 | Poulos | ..... | 280/124.174 |
| 4,128,355 A * | 12/1978 | Leaf | ..... | 403/222 |
| 4,502,707 A * | 3/1985 | Jable et al. | ..... | 280/682 |
| 4,660,851 A * | 4/1987 | Perlini | ..... | 280/124.11 |
| 5,078,420 A * | 1/1992 | Jable et al. | ..... | 280/680 |
| 5,209,518 A * | 5/1993 | Heckenliable et al. | ..... | 280/680 |
| 5,850,069 A * | 12/1998 | Betts | ..... | 219/137 R |
| 5,971,654 A * | 10/1999 | Sweeney, Jr. | ..... | 403/400 |
| 6,206,407 B1 * | 3/2001 | Fuchs et al. | ..... | 280/686 |
| 7,520,517 B2 * | 4/2009 | Svendsen et al. | ..... | 280/124.175 |
| 7,857,517 B1 * | 12/2010 | Vicars | ..... | 384/430 |
| 8,231,278 B1 * | 7/2012 | Carruth et al. | ..... | 384/294 |
| 2012/0187670 A1 * | 7/2012 | Felipe de Souza Araujo et al. | ..... | 280/788 |

FOREIGN PATENT DOCUMENTS

BR    8900182 U2 * 10/2010

* cited by examiner

*Primary Examiner* — Joseph Rocca
(74) *Attorney, Agent, or Firm* — Amster, Rothstein & Ebenstein LLP

(57) ABSTRACT

The present patent of invention refers to a rear bogie-type suspension used preferably in trucks, having a pivoting bearing (1) disposed on upper part of the spring pack (2), positioned between the two axles and laterally on each side of the chassis (5), said pivoting bearing (1) comprised of an anchor pin (3) fastened to a hanger (4) and to the chassis (5), in a robust manner to withstand the extreme strains to which this kind of suspension is normally submitted, also favoring assembly conditions, weight reduction, reduced consumption of materials and labor, also having an axle rebound stop (6) in combination with spring pack (2) in order to provide greater safety and durability to its components.

7 Claims, 5 Drawing Sheets

REAR BOGIE-TYPE SUSPENSION

The present patent of invention refers to a new rear bogie-type suspension used preferably in trucks, having a pivoting bearing on upper part of the spring pack, positioned between the two axles and laterally on each side of the chassis, said pivoting bearing comprised of an anchor pin fastened to a hanger and to the chassis in a robust manner to withstand the extreme strains to which this kind of suspension is normally submitted, also to improve the assembly conditions, weight reduction, reduced consumption of materials and labor.

In the rear bogie-type suspension of the present invention there is also provided a new set of axle rebound stop in combination with spring pack which avoids the release of the axle, in the event that the suspension undergoes on an extreme strain, and if any primary link component of the axle fails, providing greater safety and durability of its components.

Said axle rebound stop comprises a spring pack having hooks at the ends, where the brackets provided with pins are housed and said brackets being fixed to the vehicle axles.

In the preferred embodiment of this new suspension, in applications requiring greater comfort, an elastomer cushion is added between the spring bracket and the removable wear plate in the region where the ends of the leaf spring housing the brackets and this brackets on the axle.

BACKGROUND OF THE INVENTION

Bogie-type suspensions for trucks are comprised of two axles and a central spring pack on each side of the truck chassis, and also equipped with upper and lower reaction rods for the longitudinal linkage of the axles, central hangers with pivoting bearings and supports for housing the reaction rods and the springs in the chassis and on the axles.

Bogie suspensions have the characteristic of having a good load distribution between the axles, being most used for application in 6×4 trucks, on the rear axles, in order to guarantee the tire adherence on the ground.

Although these suspensions are more expensive, compared to spring pack and equalizer models, they are the most used for severe applications in trucks in off-road conditions, due to the need to reduce the time and maintenance frequency, having more vehicle availability to work.

These suspensions are also used for trucks on road applications, due to legal requirements in relation to combinations with trailers and/or semi-trailers, being the suspensions used in these cases very rigid, therefore low comfort for drivers due to vibration.

Among the solutions adopted and known in the state of the art for this type of suspension is the model shown in FIG. 2, which gains prominence due to the position of the pivoting bearing being in lower part of the spring pack. Said suspension also uses axle rebound stop located at the front and rear ends of the suspension with the axles as shown, and springs brackets with removable wear plates with the springs fixed rigidly to each other and to the axle.

These suspensions of the state of the art which have articulating pivot located in the lower part of the spring pack are in general designed in solid and cylindrical bearings mounted on metallic bushing, roller bearings or elastomeric bushing.

The pivot located in the lower part of the spring pack is normally positioned in a region far from and right below the chassis, owing to the space and conditions available by the structural disposition of the vehicle, thus hampering the construction of the anchor frame with the chassis, which supports the articulating bearing of the suspension spring.

The articulating bearings of said suspensions having cylindrical and solid concept, such as revealed in the state of the art, be they with metallic bushing, roller bearings or elastomeric bushing, hamper the process of assembly and disassembly in the vehicle, as they only allow movement and displacement laterally to the chassis. To be disassembled in the case of vehicle maintenance, the wheels must be removed.

Patent document U.S. Pat. No. 6,206,407 illustrates an example of rear bogie-type suspension for trucks, describing a concept of articulation of the suspension between the two axles in the upper part of the spring, which is not exactly a pivot, as it is constructed such that the articulation of the spring occurs by elastic deformation, by an axle-box with various layers of elastomers, interconnected by metal plates.

In the suspension described above, the concept of bearing is idealized in a complex manner, and to be manufactured requires the use of complex and more expensive technologies and processes.

The document cited above also shows a system for fastening the bearing to the chassis by way of fasteners or screws, having the disadvantage of hampering the vehicle assembly process, by requiring an approximation and accurate alignment to coincide with the housing holes in the support.

It must be highlighted that to mount said bearing on the chassis support, it is necessary to use special means and tools, suitable for moving the bearing until it coincides with the housing holes in the support, further worsened by the residual distortion resulting from the elastic memory characteristic which normally results from the manufacturing process thereof, requiring an additional effort from the assembler to correct it, making the assembly process hard and more expensive.

The other matter cited previously is that the bogie suspensions of the state of the art also use axle rebound stop, which are normally conceived by way of steel cables mounted on terminals, which are housed in brackets, bolted to the chassis and to the axles.

The function of said axles rebound stop is to act as safety devices to provide for any failures of the components, which support the axles to avoid the displacement and, to stop of the suspension and axles rebound.

One of the drawbacks of the axles rebound stop cited in the current art is the high cost, because they are made of various and complex components, also due to the various manufacturing processes they undergo, and the installation difficulty, which generates wasted material and labor and, the necessity for more logistic controls.

Another drawback presented in said axles and suspension rebound stop is that since they are comprised of various and complex components, they tend towards failure due to the variability of the manufacturing and installation processes, thus being subject to functional problems, which may cause damage to the suspension, to the vehicle, and offer risk of accidents with other vehicles on the road, and to their users.

Document U.S. Pat. No. 5,078,420 refers to tandem axle suspension characterized by the fact that it has means for interconnecting each end of the springs to the axles, which comprises a spring anchoring mounted on the lower part of the end of the springs and a bracket on the axle mounted thereon, which extends upwards involving an elastomeric shock absorber, with the aim of eliminating the upper torque rods, and allow the joint axes relative to the springs pack in transversal and longitudinal direction.

The drawback of the system described is that it is comprised by various and complex components and, which consequently increase costs and also propensity to failures.

Among the drawbacks found in the rear bogie-type suspensions for the state of the art trucks, the most relevant is the constructive difficulty of the anchoring of the pivoting bearing, owing to the fact that it is positioned beneath the spring pack and far from the chassis, which requires a construction of a more complex frame, with greater consumption of material and more manufacturing processes, resulting in considerably higher weight and costs.

Another drawback presented in the rear bogie-type suspensions used today in trucks is the difficulty in assembling the kit of springs and bearing on the support and the chassis, causing wastage and lost time with more stages in the assembly line and the necessity for specific devices.

There is therefore a need in the state of the art to provide a new rear bogie-type suspension to solve the drawbacks cited, more specifically in simplifying and improving the system of pivoting bearing and its anchor pin fastened to the central hanger, in a more robust manner, and also to provide a safer axle rebound stop, whereby reducing the possibility of suspension failure.

These new constructive forms will also contribute to improve the assembly conditions and comfort of the suspension on the vehicle, as it also allows the use of a two pieces bearing, plus the possibility of vertical mounting of the spring pack on the vehicle, and also the use of an elastomeric cushion at the ends of the leaf spring.

OBJECTIVES OF THE INVENTION

The main objective of the present patent of invention is to provide a new rear bogie-type suspension for trucks, having a pivoting bearing on upper part of the spring pack, to improve the assembly, weight reduction, reduced consumption of materials and labor.

Another objective is also to develop a rear bogie-type suspension having a new axle rebound stop in combination with spring pack, to prevent detachment of the axle, in the event that the suspension undergoes on an extreme strain, and if any primary link component of the axle fails, providing higher safety and durability of the components of the suspension.

Another objective to improve the vehicle comfort on road is to add an elastomeric cushion between the ends of the leaf spring areas with the bracket and the axle.

DETAILED DESCRIPTION OF THE INVENTION

Figure 1:
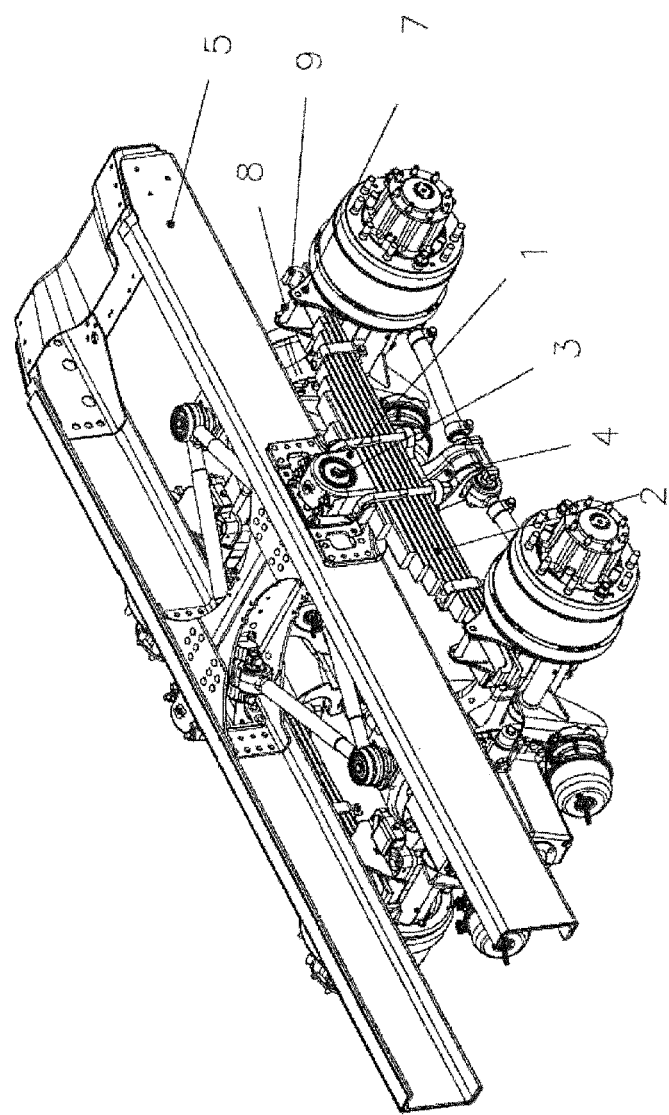
FIG. 1—Perspective view of the rear bogie-type suspension in accordance with one embodiment of the present invention.
Figure 2:
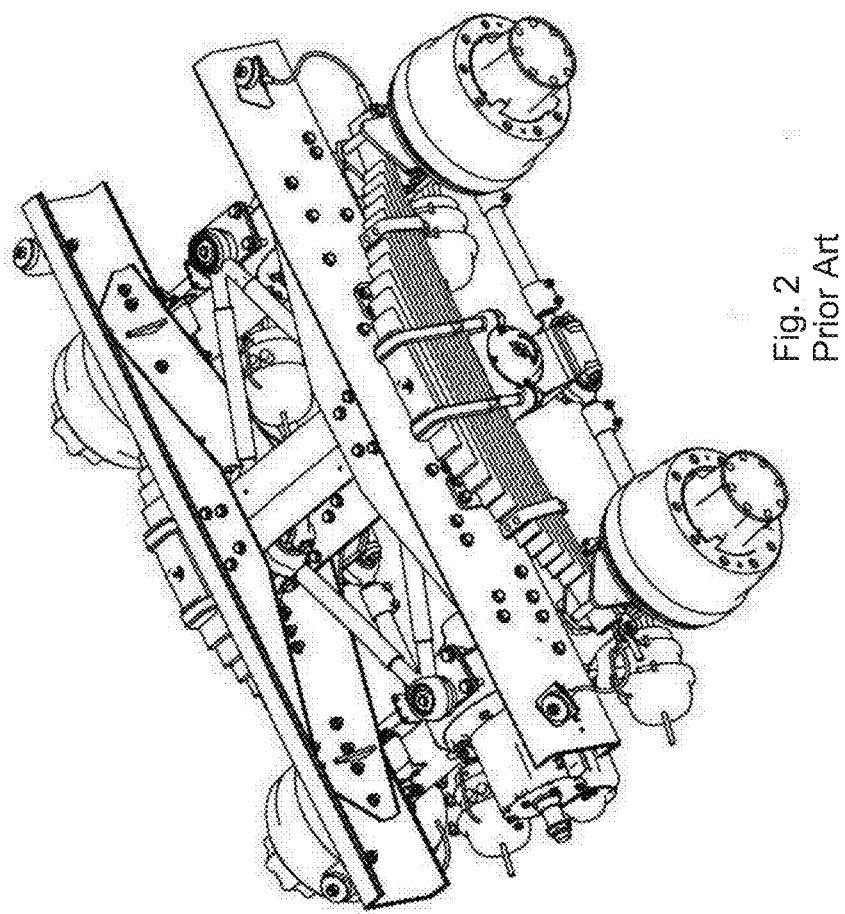
FIG. 2—Perspective view of a typical rear bogie-type suspension used in trucks, according to the state of the art.
Figure 3:
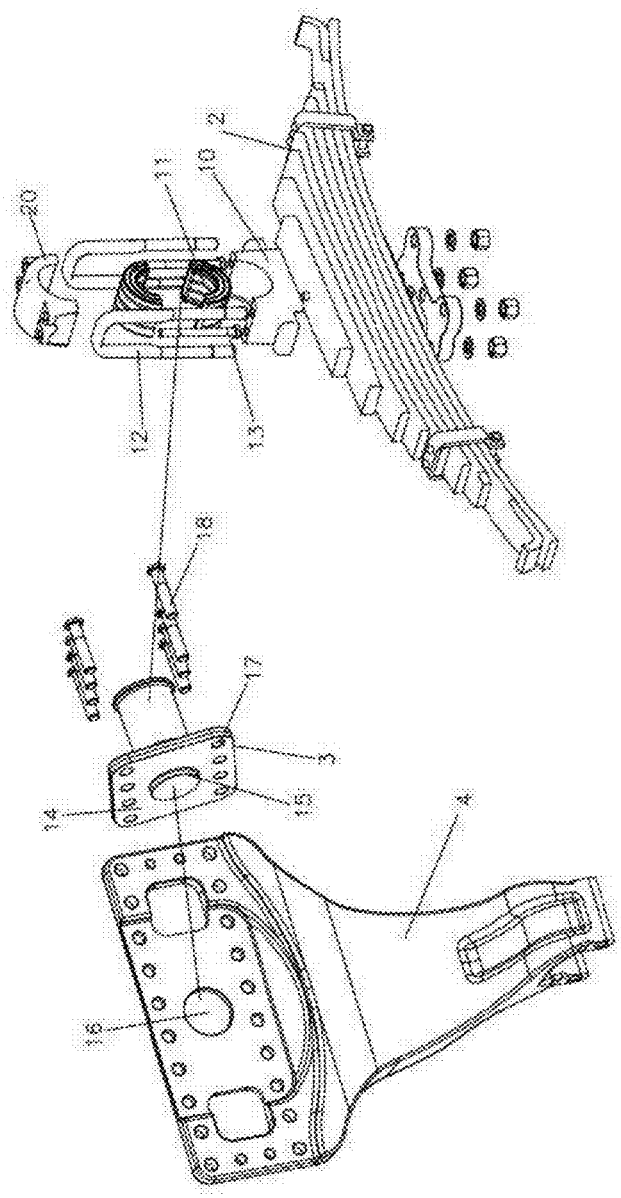
FIG. 3—Exploded perspective view of the pivoting bearing assembled on upper part of the spring pack and the housing of the anchor pin bolted to a hanger, object of the present patent of invention.
Figure 4:
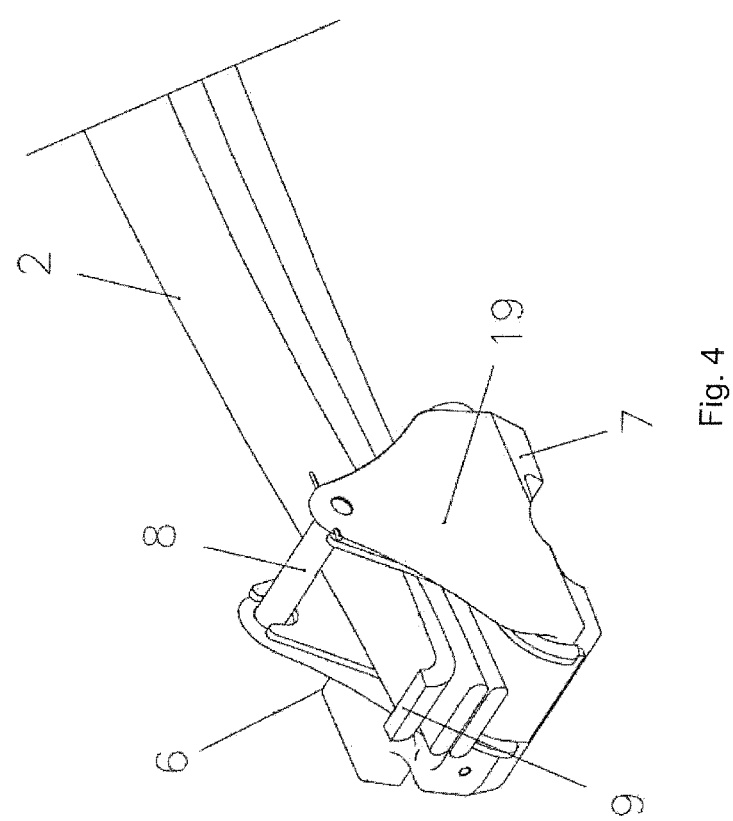
FIG. 4—Perspective view of the detail of the axle rebound stop in combination with spring pack.
Figure 5:
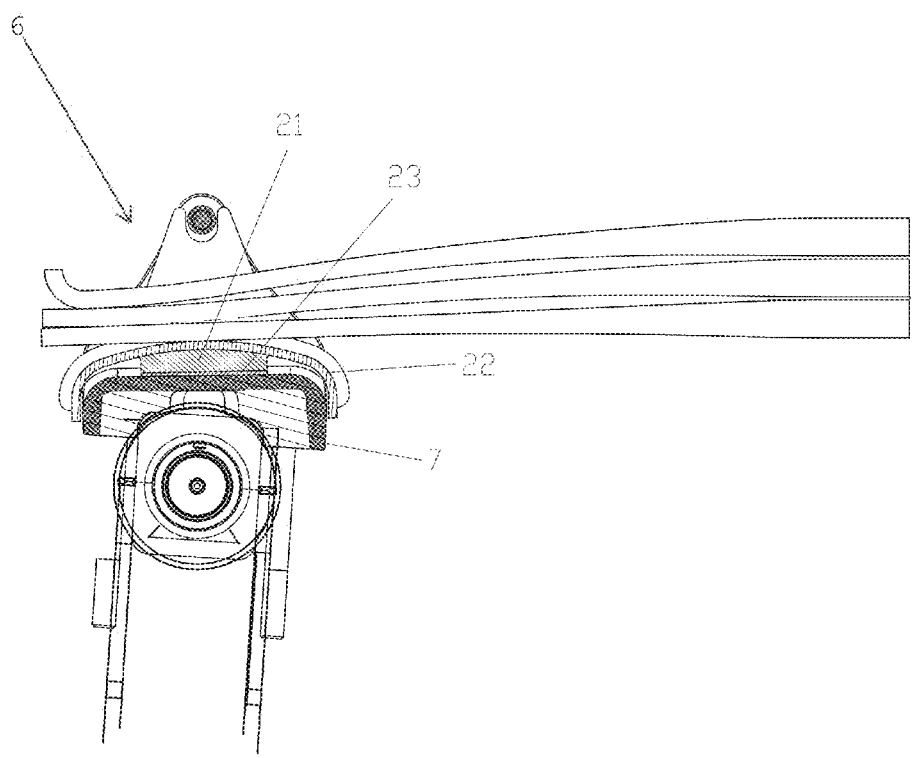
FIG. 5—Cross-sectional view of the axle rebound stop in combination with leaf spring ends, illustrating the detail of the removable wear plate with the elastomeric cushion.

In accordance with the illustrated in the accompanying drawings, the present rear bogie-type suspension used preferably in trucks, comprised of spring pack, upper and lower reaction rods for the longitudinal linkage of the axles, supports for housing the reaction rods on the axles and on the chassis, springs brackets housed in the axles and, other suspension components, comprises a pivoting bearing (1) disposed and fastened on upper part of the spring pack (2) and to an anchor pin (3), fixed and housed in a central hanger (4), and both bolted laterally to the chassis (5), there being also provided a axle rebound stop (6) in combination with leaf spring ends, bolted to the vehicle axles, which comprises a spring bracket (7), comprised of a base and two substantially triangular side plates (19), which are interconnected by the upper part by way of a stop pin (8), which acts as a limiter for at least one leaf spring which is provided with a hook (9) at the end.

The pivoting bearing (1) is comprised of the anchor pin (3), semi-bearings (10, 20), semi-bushings (11), spring clamps (12) and bolts (13).

The anchor pin (3) has a substantially square-shaped base (14), having a centralized circular projection (15) to house and to insert into the hole (16) of the central hanger (4) and equidistant through holes (17) on the sides for boltenning it to the same hanger and to the chassis by way of the bolts (18).

Other constructive embodiments of the housing of the pin (3) to the hanger (4) can be exemplified as being the base (14) itself, inserted in a housing in the hanger (4) and having any geometric shape, any fake part, inserted into both parts (3, 4), part of the hanger (4) itself inserted into the pin (3), other types and shapes of the projection (15) of the base (14), etc.

The semi-bushing (11) is made of elastomeric material, formed in metal and elastomer or any other material having equivalent characteristics and properties.

The semi-bearings (10, 20) are fixed together by bolts (13) and have the function of fastening and compressing the semi-bushings (11) on the body of the anchor pin (3), in order to prevent sliding between the parts in contact, such that the oscillating movement of the bearing (1) together with the spring pack (2) around the pin (3), be it only by way of the elastic deformation of the elastomer of the semi-bushings (11).

Additionally, said fastening via semi-bearings, provides an axial locking between the semi-bearings (10, 20) with the semi-bushings (11) to the pin (3), due to the existence of fittings and edges in these parts which prevent lateral movement, thus not requiring additional fasteners.

The spring pack (2) is provided with at least one leaf spring having hooks (9) at the ends, which are made by bending the end of at least one or more leaf springs.

The stop pin (8) acts as a limiter for the hook (9) during movement of the suspension and limits the rebound of the axle so as to prevent it from detachmenting from the suspension.

In the preferred embodiment of the invention, the limiter is the stop pin (8), yet other forms may be idealized, such as by an extension solidary to the side plates (19) of the bracket (7), which may be a part obtained by casting or fabricated in parts and joined by welding which jointly may vary in design or shape to be conceived.

The working and action of the set of axle rebound stop (6) in combination with leaf spring ends of the present invention occur by the movement of the suspension when subjected to extreme strains and at the end of the rebound, or in the event of rupture or release of the support elements of the axles, such as reaction rods, etc.

In another embodiment of this new suspension designed for use in applications which require more comfort, an elastomer cushion (21) is added between the spring bracket (7) and removable wear plate (22), in the region where the ends of the leaf spring are lodged in the said bracket.

The cushion (21), and the plate (22) get a group due to the vulcanization of the rubber to the metal and the said cushion can be prepared in any elastomeric material with damping properties. On the opposite surface another metallic plate (23) is also added by vulcanization which supports the bracket (7).

In practice, the new rear bogie-type suspension for trucks provides a significant reduction in expenses with materials and labor, due to the reduction in weight and in quantity of components, to the reduction in time and frequency of maintenance, besides being constructively more robust to support more efficiently the extreme strains to which it is subject.

Those skilled in the art will easily understand that changes can be made to the invention without, in so doing, straying from the concepts set forth in the above description. These changes should be considered as included within the scope of the invention. Consequently, the particular embodiments described in detail previously are merely illustrative and not limitative in terms of the scope of the invention, to which the full extent of the accompanying claims should be given and of all and any equivalents thereof.

The invention claimed is:

1. Rear bogie-type suspension having spring packs, upper and lower reaction rods for the longitudinal linkage of the axles, supports for the accommodations of the reaction rods on the axles and on the chassis, and other suspension components, comprising:
    a pivoting bearing comprising an anchor pin, surrounded by semi-bearings and semi-bushings, fixed together by bolts, wherein said semi-bearings fix and compress the semi-bushings, and the pivoting bearing is fastened to a spring pack by spring clamps;
    an axle rebound stop in combination with the spring pack, fastened to one of the vehicle axles, which comprises a spring bracket, comprised by a base and two side plates, which are interconnected by way of a stop pin, which works as a limiter for at least one leaf spring which is provided with a hook at an end of the at least one leaf spring, further having a set comprising an elastomer cushion located between a removable wear plate and a metallic plate, said set located under an end of the spring pack and on the spring bracket; and
    wherein said pivoting bearing is disposed and fastened on an upper part of the spring pack and to the anchor pin, which is fixed to and housed in a central hanger and, both the anchor pin and the central hanger fixed laterally to the chassis by way of bolts.

2. Rear bogie-type suspension, according to claim 1, wherein the anchor pin has a base having a centralized projection, which is housed and inserted into a hole of the central hanger (4), and the base comprises equidistant through holes for fixing to said hanger and to the chassis by way of the bolts.

3. Rear bogie-type suspension, according to claim 1, wherein the anchor pin has a base which is inserted directly into a housing of the central hanger.

4. Rear bogie-type suspension, according to claim 1, wherein the semi-bearings have fittings and edges for housing the semi-bushings to promote axial locking with the anchor pin, also having edges for axial retention, against the side movement of said pin.

5. Rear bogie-type suspension, according to claim 1, wherein the semi-bushings are made of an elastomeric material, formed in metal with elastomeric or any other material having an equivalent characteristic.

6. Rear bogie-type suspension, according to claim 1, wherein the stop pin is an extension to the sides plates of the bracket, obtained by casting or formed in parts and joined by welding.

7. Rear bogie-type suspension, according to claim 1, wherein the hook of the at least one leaf spring of the spring pack is made by bending of the end of the at least one leaf spring.

* * * * *